INVENTOR.
ELDON W. BALL
BY Herbert W. Arnold
ATTORNEY

Jan. 19, 1965 E. W. BALL 3,166,750
ANTENNA INTERSECTING-ORTHOGONAL-AXES GIMBAL MOUNT UTILIZING
ROTARY BEARINGS FOR TWO AXES AND PUSH-PULL
LINKAGE FOR THIRD AXIS
Filed Feb. 14, 1961 3 Sheets-Sheet 2
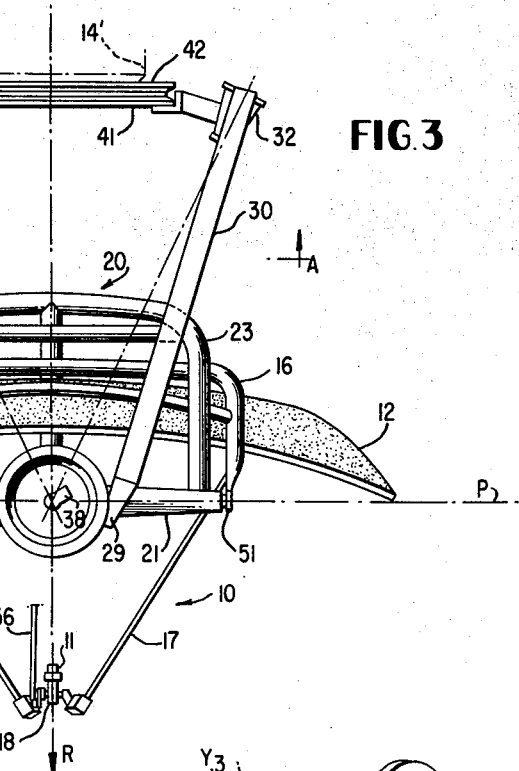
FIG.3
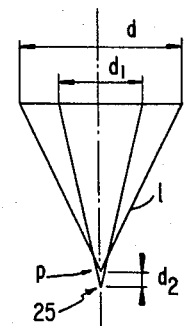
FIG.8
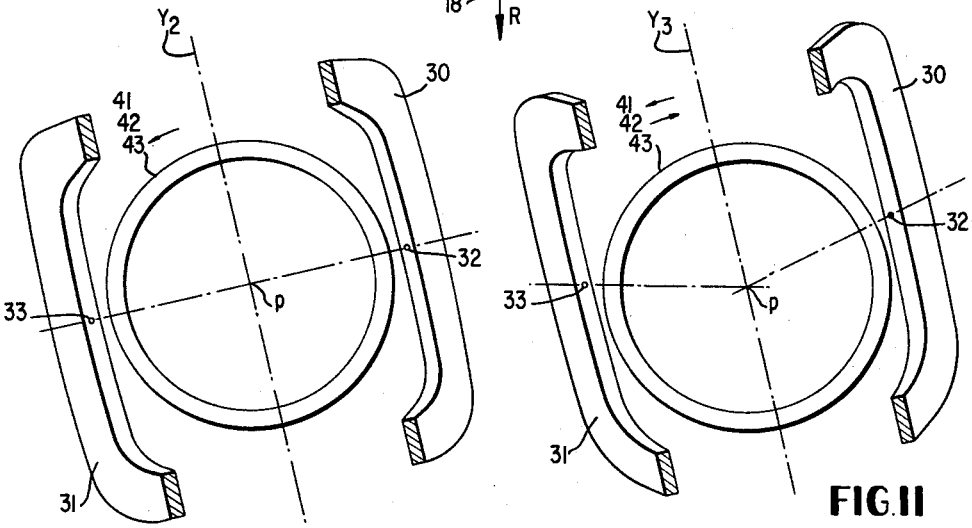
FIG.10
FIG.11
INVENTOR.
ELDON W. BALL
BY Herbert W. Arnold
ATTORNEY Jan. 19, 1965            E. W. BALL            3,166,750
ANTENNA INTERSECTING-ORTHOGONAL-AXES GIMBAL MOUNT UTILIZING
ROTARY BEARINGS FOR TWO AXES AND PUSH-PULL
LINKAGE FOR THIRD AXIS Filed Feb. 14, 1961            3 Sheets-Sheet 3

*INVENTOR.*
ELDON W. BALL
BY *Herbert W. Arnold*

*ATTORNEY*

United States Patent Office 3,166,750
Patented Jan. 19, 1965

3,166,750
ANTENNA INTERSECTING-ORTHOGONAL-AXES GIMBAL MOUNT UTILIZING ROTARY BEARINGS FOR TWO AXES AND PUSH-PULL LINKAGE FOR THIRD AXIS
Eldon W. Ball, Sudbury, Mass., assignor to Raytheon Company, Lexington, Mass., a corporation of Delaware
Filed Feb. 14, 1961, Ser. No. 89,155
9 Claims. (Cl. 343—705)

The present invention relates to a directive mechanism, and more particularly to the apparatus and method for gimbal mounting a radiant energy directive member to attain a minimum swept volume for a given size reflector.

A radio echo system may have an antenna which comprises a radiator and a paraboloidal reflector. At least the reflector of the antenna is mounted so that it may be turned relative to the fixed components of such radio echo system in order that radiant energy may be directively beamed toward a target. Further, means may be included to provide relative movement between the radiator and reflector to effect limited scanning or tracking movement of the beam about the axis of the directive path established by the reflector.

When a radio echo system of the type referred to is installed on a vehicle such as a ship or an aircraft problems of stabilizing the reflector arise due to the effects of rolling, pitching, or yawing of the vehicle; for the directive path along which the energy is beamed by the antenna is required to be fixed in space so as to be substantially independent of movements of the vehicle. To achieve such stabilization the vehicle may be provided with gyroscopic means which will remain substantially stationary despite roll, pitch or other movement of the vehicle, and which will provide compensating signals or forces to maintain the reflector stabilized to direct the beam along a fixed predetermined space path.

The present invention provides means to stabilize a radio echo system antenna in all three planes; roll, pitch, and yaw.

According to the present invention a method of gimbal mounting an antenna is provided wherein the axes of stabilization in all three planes intersect at a common optimum pivot point. Such common pivot point is located in relation to the reflector and radiator so that a minimum volume is swept during movements thereof. It will be appreciated that the provision of a minimum volume requirement for reflector movement is often a determining factor due to the limited space of the so-called radome within which the apparatus is mounted on the vehicle.

In accordance with the present invention, when the reflector is of paraboloidal or generally concave shape the common intersection point of the three axes of stabilization will lie in front of the reflector in a high energy area where structural members may not be used due to their obstruction of the radiant energy paths. Accordingly, the present invention provides a form of virtual hinge in at least one plane of stabilization to thus permit the projected axes of all bearings which support the roll, pitch, and azimuth or yaw motions of the antenna assembly to converge and pass through a common stabilized pivot point while no physical hinge structure is positioned in front of the reflector.

An object of the present invention is to provide a method and apparatus for gimbal mounting an antenna suitable for achieving the above purposes and provisions.

A further object of the present invention is to provide a virtual hinge in at least one plane of stabilization by the application of conic linkage techniques. Such techniques establish a virtual hinge or pivot location by means of convergent intersecting lines drawn through or projected from the axes of bearings which are physically removed from the hinge pivot location; the bearings lying along a circular path which is the base of a right triangular cone whose tip is at the virtual hinge location.

An additional object of the present invention is to provide a method of supporting the reflector of a radio echo system such that maximum reflector aperture may be obtained while the volume swept by a given size reflector is maintained at a minimum. Such object is achieved by the elimination of trunnions at the reflector edges which ordinarily reduce the aperture for a given swept volume.

A more specific object of the present invention is to stabilize the azimuth axis of a vehicular mounted radio echo system antenna against movements in both roll and pitch.

Another specific object of the present invention is to provide an antenna mounting assembly for use on a vehicle which will remain substantially constant with respect to the axes of such vehicle.

A further and more specific object of the present invention is to provide a stabilized gimbal mounting for the reflector of a radio echo system carried on a moving vehicle, wherein such mounting means are located or established by a fixed base plate attached to the vehicle structure at a position located rearwardly of the reflector whose nominal line-of-sight may generally bear a predetermined relation to an axis of the vehicle.

An additional object of the present invention is to provide a stabilized antenna mount wherein the three axes of stabilization intersect at a common point; such point being at or near the center of gravity of the concave reflector surface, in order to reduce or minimize inertial forces developed during movements of the reflector and/or vehicle.

Another object of the present invention is to provide a suitable mounting means which will permit a non-spherical non-symmetrical concave antenna reflector dish to be spaced from and gimbally supported with respect to a fixed base plate or reference plane, within a minimum volume.

The above and further objects, advantages, features and provisions of the invention will become readily apparent and better understand by reference to the following detailed description of a preferred embodiment thereof when considered in connection with the accompanying drawings, wherein:

FIG. 3 is a plan view of the major elements of the arrangement shown in FIGS. 1 and 2;

Figure 1:
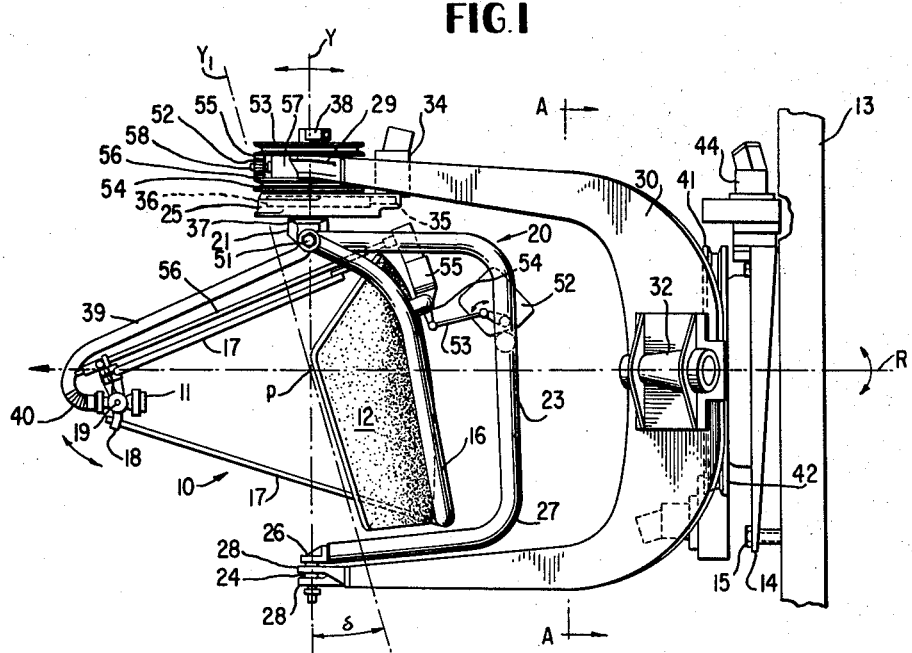
FIG. 1 is a side elevation view of the overall antenna arrangement.

FIGS. 6–9 are isometric and plan diagrammatic views of the mounting geometry of the antenna reflector useful in explaining the corrections for vehicular pitch and roll; and FIGS. 10 and 11 are fragmentary isometric views of major elements of the antenna supports viewed from the indicated planes A—A of FIGS. 1 and 3, showing the attitudes for corrections of vehicular roll, and roll plus pitch, respectively.

As indicated in the side elevation of FIG. 1, a radio echo system mounted upon a vehicle may have an antenna arrangement 10 which comprises a radiator 11 and a reflector 12. By way of example, the radiator 11 is illustrated as a waveguide flare or horn which couples radiant energy to and from the surface of the reflector.

Reflector 11 establishes a directive path in space for the beam of radiant energy, and to this end is of a generally concave shape and may be, in practice, a particular modified spherical, elliptical, or parabolic surface, as is well known in the art.

Reference numeral 13 denotes a structural member of the vehicle upon which the radio echo system is mounted. In the preferred embodiment member 13 denotes a portion of a substantially planar bulkhead which is normal to the major longitudinal axis of the vehicle. Thus for the purposes of the following description, it will be presumed that member 13 lies in a substantially vertical plane at right angles to the longitudinal axis R of the vehicle and to the direction of forward movement thereof. If for example, the vehicle is an aircraft, then the axis R will pass through the center thereof in a fore-and-aft direction from the tail toward the nose, and the direction of flight or motion is to the left as indicated by the directional arrowhead applied to the axis R. All rolling movements of the vehicle take place about the axis R, and this is also chosen due to the geometry and location of the mounting arrangement for antenna 10, as the roll axis for the antenna system. When the vehicle is a winged aircraft roll may be envisioned as a maneuver wherein one wing tip moves upwardly while the opposite wing tip moves downwardly.

Axis P denotes the pitch axis of the antenna system. This is the axis about which the reflector surface moves in order to compensate for pitching motion of the vehicle which occurs when the nose thereof moves up or down. Axis P is at right angles to the roll axis R. The actual pitch axis of the vehicle is not shown, but it runs transverse of the vehicle and is parallel to axis P. A third axis Y, normal to both axes R and P, is the yaw axis for movements of the antenna system. Such axis is parallel to the yaw axis of the vehicle, and movements of the reflector about Y produce azimuth movements of the directive antenna beam.

The axes R, P and Y are the ones about which the antenna arrangement 10 is stabilized during movement of the vehicle, and about which corrective movements are made under the control of compensating signals or forces derived by suitable gyroscopic means, not shown, carried by the vehicle. The same axes R, P and Y may also hereinafter be interchangeably designated as the roll, pitch and yaw axes of the antenna reflector 10 due to the fact that such reflector is the principal system element of bulk and volume. Radiator 11, which is supported by the reflector, moves with it; and together these elements comprise the antenna system or arrangement 10.

Reference numeral 14 designates a base plate of substantially planar configuration upon which all of the antenna mount structure is carried. Base plate 14 is secured to the vehicle frame member 13 by a plurality of fastening elements 15 in a manner to ensure against any relative movement. When the antenna base 14 is attached to the vehicle bulkhead it is positioned so that the aforementioned reflector axes R, P, and Y are properly oriented with respect to their corresponding vehicular axes. The antenna mount base plate 14 may be designated as a "platform," in accordance with known terminology in the art. Such terminology is to be construed in its broadest application wherein such "platform" denotes a planar surface, but not necessarily limited to a horizontal one. It will of course be apparent that, except for the designation and nomenclature of the several axes of stabilization involved, that the antenna mounting "platform" and the structural member 13 of the vehicle may be located in a horizontal plane rather than in the vertical one shown in FIG. 1.

In accordance with the principles of the present invention the common intersection point $p$ for the three axes of stabilization of the antenna is located so that a minimum volume is swept during movements of the antenna system. Movement of the antenna in all three planes is accomplished by means of a plurality of pivoted connections which are provided in the mounting structure which supports and spaces the antenna from the base plate 14. A primary supporting assembly 16 is provided at the rear of reflector 12 and radiator 11. The reflector is permanently attached to the forward surface of such supporting assembly by any convenient means. Supporting assembly 16 may comprise a plurality of substantially vertical and horizontal frame members, and in the preferred embodiment of the invention these are of tubular metallic form suitably interconnected by any convenient means as, for example, by welding. The radiator 11 is positioned in front of the reflector 12 by means of a plurality or rigid struts 17. The forward end of each strut is attached to a block 18 which pivotally supports the radiator 11. The axis of the pivot 19 is parallel to that of axis P so as to permit limited movement of the radiator in a manner to be discussed in detail below, in order that the radiator may be properly positioned with respect to the antenna reflector to obtain a selected "field-of-view." The aft or rear ends of struts 17 are secured to spaced points on the supporting assembly 16 as shown in order to provide a tripod mounting arrangement of minimum surface area which affords the least possible amount of obstruction to the antenna beam pattern.

An intermediate supporting assembly 20 is provided which is of slightly larger vertical dimensions than that of the primary assembly 16 and the radiator 12. This intermediate supporting assembly includes an upper arm 21 which, in the antenna position shown in FIGS. 1 to 3, extends substantially parallel to the axis P; and a pair of bent arms 22, 23 attached to the extremities thereof. The upper portion of each of the arms 22, 23 extends rearwardly and horizontally from the point of attachment for a sufficient distance to permit limited movement of the primary supporting assembly 16 with respect to the intermediate supporting assembly 20. From this point each arm is bent downwardly to pass to the rear of the primary assembly and its attached reflector, and the lower ends of each arm are joined to a common lower arm 27 which extends downwardly and is then bent in a forward direction to extend beneath assembly 16 to a location which overlies the lower antenna pivot 24 on the Y axis. The midpoint of member 21 is located under the upper antenna pivot 25 on the Y axis. Thus, as indicated in FIG. 1, the intermediate supporting assembly 20 is secured at its lower end to a lower antenna pivot element 26, and at its upper end to the corresponding upper antenna pivot element 25.

The corresponding elements of the lower and upper pivots along the Y axis are provided by the members 28 and 29, respectively. Pivot elements 28 and 29 are carried at the extremities of the U-shaped port and starboard yokes 30 and 31. Port yoke 30 is secured at its rear central portion by a pivot means 32 adjacent to the base member 14, while starboard yoke 31 is similarly pivotally secured by the means 33.

The yokes 30 and 31 provide the ultimate support for the antenna assembly 10 and space the same from the base plate 14 and the vehicle structural member 13. The points of intersection of the forward or open yoke ends determine and establish the location of the pivots 24 and 25 which, in turn, establish the Y axis. Thus in the position shown in FIG. 1, azimuth rotation of the directive reflector 12 and the radiating horn 11 is produced by means of the azimuth drive motor 34 which is mounted above the point of intersection of the upper yoke arms. The azimuth drive is by means of the gears 35 and 36, the latter of which is secured to a substantially vertical shaft which passes through the upper pivot 25 and is attached to the center of member 21 of the primary supporting assembly 16. Such azimuth drive shaft is identified by the reference numeral 37, and a waveguide feed coupling 38 is mounted concentrically, but non-rotatively, therewith in order to transfer energy to and from the horn radiator 11. The upper pivot 25 includes a rotatable waveguide coupling or joint, not shown, which may be of conventional construction. Reference numeral 39 represents suitable waveguide structure which rotates with the antenna assembly 10 to interconnect such rotary joint with the radiating horn 11. It will be noted that a section 40 of such waveguide structure is provided at the termination which feeds the horn. Section 40 may be a flexible waveguide configuration as shown, or a suitable joint which will permit movement of the horn 11 about the pivot 19.

In addition to positioning the antenna assembly 10 in azimuth, the drive motor 34 may be energized with corrective voltages derived from the gyroscopic means on the vehicle in order to compensate for yawing movements of the vehicle so as to maintain the reflector stabilized in its azimuth direction.

Figure 2:
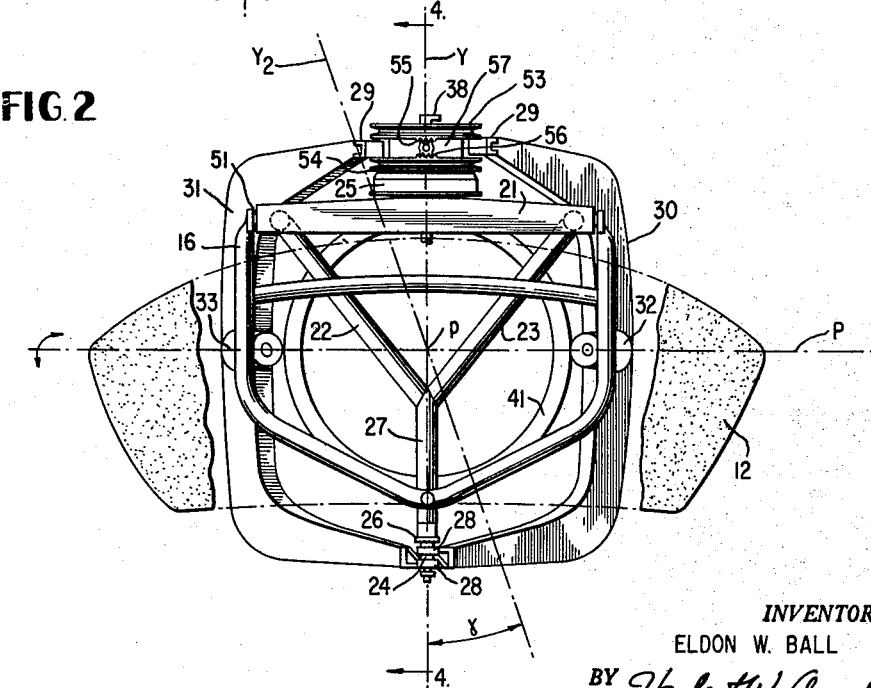
FIG. 2 is a front elevation view of the arrangement shown in FIG. 1 wherein certain details have been omitted for the purposes of clarity.
Figure 4:
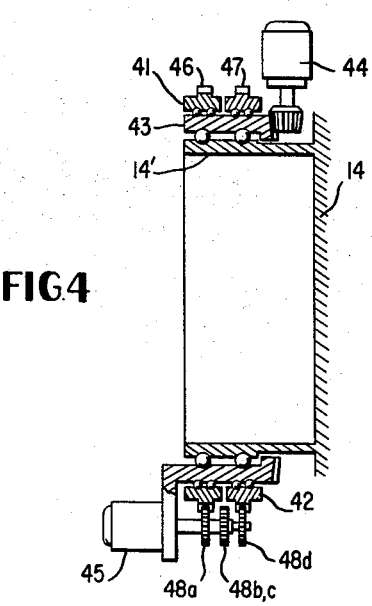
FIG. 4 is a sectional elevation view, to an enlarged scale, showing certain details of the invention, as taken in the indicated direction 4—4 along the Y-axis of FIG. 2.

Referring now to the details of FIGS. 2, 3 and 4, it will be apparent that the bearing 32 of the port yoke 30 is supported for movement along a circular path at base plate 14 on a ring member 41. Ring 41 is centered on the roll axis R and is designated as the front pitch ring. In a similar manner the starboard yoke 31 is pivotally attached at 33 to a rear pitch ring member 42. Pitch rings 41 and 42 are provided with suitable bearings as schematically indicated in FIG. 4, and are rotatably mounted upon a roll ring 43. The roll ring is attached by suitable bearings to the base plate extension boss 14′, and is provided with gearing which interconnects it with the roll drive motor 44, which motor is permanently attached to the boss by any suitable means, not shown. Drive motor 44 may be energized to rotate the roll ring 43 in either a clockwise or counterclockwise direction. Ring 43, through intermediate means 45 and 48, in turn moves rings 41 and 42 in unison in the same circular path direction so as to roll the antenna assembly 10 attached to the forward ends of the yokes about the axis R.

A pitch drive motor 45 is secured to the roll ring 43 and travels with it during movements thereof. Front pitch ring 41 and rear pitch ring 42 are provided with gear teeth elements 46 and 47, respectively. Gears 46 and 47 mesh with common intermediate gears $48a, b, c, d$ on the pitch drive motor 45 in the manner shown in FIG. 5, which provide a counter-rotating movement of the two pitch rings when the motor 45 is energized.

Figure 5:
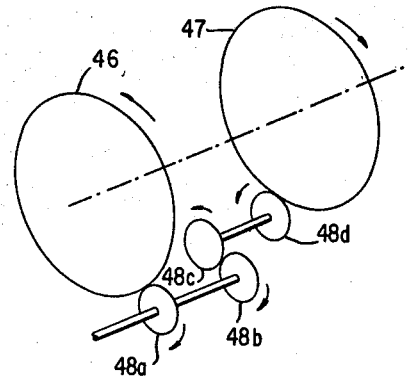
FIG. 5 is an isometric diagrammatic detail of a portion of FIG. 4.
Figure 7:
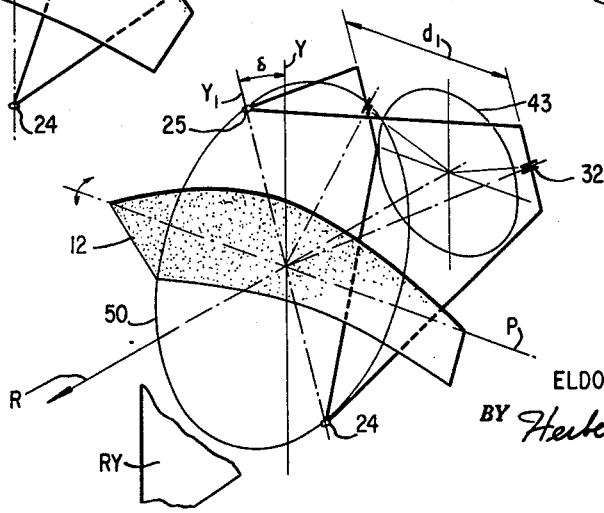

When the pitch motor 45 is energized so as to correct for a movement of the vehicle wherein the nose rises and the antenna 10 must be rotated downward a corresponding corrective amount about its pitch axis P, the front pitch ring 41 will be rotated counterclockwise while the rear pitch ring 42 moves clockwise a like amount as indicated by the arrows in FIG. 5. The total effect will be to pitch the antenna assembly 10 so that the yaw axis thereof assumes a new position, $Y_1$, as shown in FIG. 7. The $Y_1$ axis position is also indicated in FIG. 1.

Figure 6:
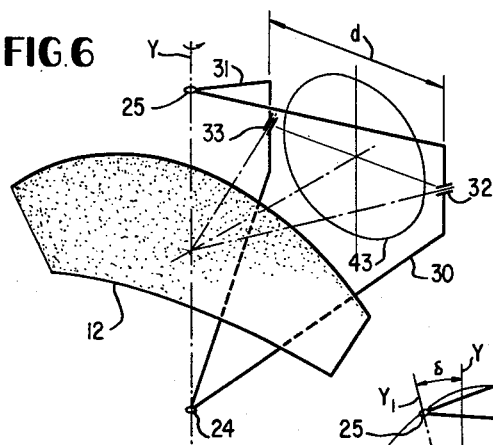

Prior to such counter-rotational movement of the pitch rings the yoke pivot points 32 and 33 lies substantially 180 degrees apart as indicated in FIGS. 2 and 6, and are separated by a fixed distance $d$ as indicated in the latter figure. Counter-rotation of the pitch rings by the drive motor 45 will move pivots 32 and 33 towards one another along the circular path of the upper portion of the periphery of roll ring 43 so that they are no longer 180 degrees apart, and the distance therebetween will decrease to a smaller dimension $d_1$ as indicated in FIG. 7. Referring to the diagrammatic plan view of FIG. 8, the geometry of the movement of the pivots 32 and 33, and the associated movement of the upper arms of the respective yokes 30 and 31, will be apparent. When the pivots of the yokes are separated by the first distance, $d$, a triangular relationship is established by the yokes which are of equal and fixed dimensions in that their upper forward intersecting ends overlie the common pivot point $p$ through which the yaw axis Y and the other two mutually perpendicular axes of antenna movement pass. When the pivots are moved closer together to the distance $d_1$ a new triangular relationship is established. Since the length of the yokes, 1, is fixed and the base distance of the triangle has been decreased to a lesser distance $d_1$, then it follows that the apex of the triangle which is the point of intersection of the forward upper ends of the yokes at pivot 25 will be moved in a direction away from the base plate 14 a distance $d_2$, or through the angle $\delta$. It should be realized that the diagrammatic geometrical relationship shown in FIG. 8 deals only with the intersection of the yokes at the upper pivot location 25. Such pivot point is moved forward; the common pivot point $p$ is fixed at the intersection of the axes R, P and Y; and the lower pivot point 24 will move rearwardly toward the base plate 14 a like distance $d_2$ through the angle $\delta$ as indicated in FIG. 7. These movements of the pivots 25 and 24 take place in the plane RY as indicated in FIG. 7, which plane is that which is defined by the intersection of the reflector axes R and Y. The movement of the lower pivot point will be apparent when it is realized that each yoke is pivotally mounted by the means 32, 33 and therefore when the upper yoke arms are drawn inwardly due to the rotation of such pivot points in the direction indicated, the lower yoke arms will be spread apart a corresponding distance.

The axes of the yoke pivots 32 and 33 lie on lines which pass through the common pivot point $p$, and movement of the pivots 32, 33 about the circular path of the roll ring 43 traces a conical surface as defined by these pivot axes. The base of such cone is along the ring 43 and the apex thereof is at the common point $p$.

Alternatively, when the pitch motor 45 is energized so as to correct for a movement of the vehicle wherein the nose thereof drops and the antenna 10 must be rotated upward a corresponding corrective amount about its pitch axis P, the front pitch ring 41 will be rotated clockwise while the rear pitch ring 42 moves counterclockwise a like amount. Such movements will bring the yoke pivots 32 and 33 towards one another along the circular path of the lower portion of the periphery of roll ring 43 so that they again will no longer be 180 degrees apart.

Corrective positioning of the antenna 10 to compensate for roll movements of the vehicle about the axis R is effected by means of the roll ring 43 and roll drive motor 44. It will be noted that the pitch drive motor 45 is secured to the roll ring 43 and therefore when such motor is de-energized the gear train $48a$–$d$ functions to lock the two pitch rings 46 and 47 against relative movement. Therefore, the established position of the yoke pivots 32 and 33 relative to one another will remain unaltered, and the entire antenna assembly 10 will be rolled about the axis R to compensate for the vehicle movement.

For example, in the case wherein the vehicle is a winged aircraft and the roll movement thereof is one wherein the starboard wing tip moves upwardly, then the required compensating movement of the antenna assembly would be a counterclockwise rotation about the roll axis R when viewed from the nose of the vehicle. In such case the roll ring 43 would be rotated in a counterclockwise direction by the drive motor 44, as diagrammatically indicated in FIG. 9.

Figure 9:
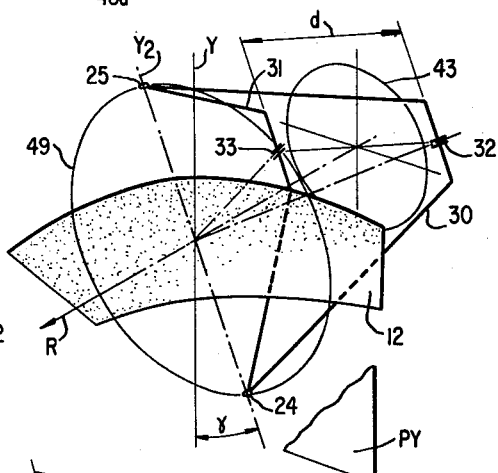

As shown in FIG. 9, the starboard yoke pivot 33 has been rotated downwardly by the counterclockwise movement of roll ring 43 from the initial substantially horizontal position of rest for such pivot as represented in FIG. 6. The port yoke pivot 32 has been driven upwardly a like amount due to the rotation of roll ring 43, and thus the upper antenna pivot 25 and the lower antenna pivot 24 have undergone corresponding counterclockwise rotation through the indicated angle $\gamma$. The total effect will be to roll the antenna assembly 10 so that the yaw axis thereof assumes a new position, $Y_2$, as shown in FIG. 9. The $Y_2$ axis position is also indicated in FIG. 2.

In FIG. 9 it is to be noted that the movements of the antenna assembly pivots 25 and 24 take place in the plane PY, which plane is that which is defined by the intersection of the antenna axes P and Y. The common pivot point p does not move, and the antenna pivots 24 and 25 follow the circular path as indicated at 49 in the PY plane. This is the case when the antenna corrective movements are made to compensate solely for roll movements of the vehicle. As previously indicated in FIG. 7, when the antenna corrective movements are for the sole purpose of compensating for pitch motions of the vehicle, the antenna pivots 24 and 25 follow a circular path indicated at 50 which lies in the RY plane.

The actual stabilization of the antenna assembly 10, neglecting for the moment the effects of yaw movement of the vehicle, will often require concurrent compensatory repositioning of the antenna in both pitch and roll. Thus, while the roll compensation motion as described in connection with FIG. 9 will cause the antenna support yokes 30 and 31 to assume a position such as that indicated in FIG. 10, if the vehicle should concurrently or subsequently undergo a change in its pitch attitude then the antenna support yokes would necessarily be further positioned in the manner as shown in FIG. 11.

Starting from an antenna position in which roll compensation has been effected by means of counterclockwise movement of the roll ring 43 as shown in FIG. 10, the additional yoke movements to effect pitch compensation may be as further indicated in FIG. 11. In FIG. 10 the antenna support yokes have been repositioned in order to stabilize the antenna assembly 10 to compensate for a vehicle roll movement wherein the starboard wing thereof has been raised, and the axis of the antenna pivots 24 and 25 will be as indicated by $Y_2$. Such repositioning of the antenna axis to the position $Y_2$ has been effected solely by the counterclockwise rotation of roll ring 43. With the roll drive motor 44 de-energized, if the pitch drive motor 45 is now energized in a manner to rotate front pitch ring 41 counterclockwise and rear pitch ring 42 clockwise, then the yoke pivots 32 and 33 will assume a new position as indicated in FIG. 11. Pivots 24 and 25 of the antenna axis will be pitched about the common pivot point p, and again will follow a circular path which is located in a different RY plane than the one indicated in FIG. 7; however, the center of such circular path remains fixed at the common pivot point p. Such counter-rotation of the yoke pivots 32 and 33 causes the antenna support yokes 30 and 31 to move in a direction which will carry the upper antenna pivot 25 in a direction which will increase the distance thereof from the base plate 14 and the rings 41, 42, 43 which are secured thereto. At the same time the yokes 30 and 31 will act to draw the lower antenna pivot 24 in a direction back toward the base plate 14.

In FIG. 11 it will now be apparent that the upper portions of each antenna support yoke have been depressed and the upper antenna support 25 carried at the intersecting ends of the yokes, not shown, has been brought forward from the base plate 14 which is to be visualized as lying in the plane of the drawing sheet. Concurrently the lower intersecting ends of the yokes have drawn the lower antenna support 24, not shown, back toward the plane of the base plate 14. The total effect is to pitch the antenna assembly 10 so that the yaw axis thereof assumes a new position, $Y_3$, which will compensate for the combined roll and pitch movement of the vehicle.

Searching or scanning movements of the antenna assembly 10 in the azimuth direction are effected by means of the drive motor 34. Such motor may be additionally energized by correction signals in order to reposition the antenna and stabilize the same against yaw movements of the vehicle. While such additional azimuth and/or yaw motion has not been shown in any of the drawing figures, it may be most readily visualized as the movement wherein the entire intermediate antenna supporting assembly 20 is rotated by drive shaft 37 about the Y axis shown in FIGS. 1 and 2. Such movement of the assembly 20 carries the entire antenna assembly with it. Thus the reflector 12, radiator 11, and the intermediate support struts 17 plus the waveguide 39 move as a complete unit. Such motion may perhaps be best visualized in FIG. 3 wherein the Y axis extends normal to the plane of the drawing through a line which includes the antenna pivots 24, 25 and the common pivot point p. In the absence of roll or pitch corrections, the antenna assembly 10 will rotate in azimuth in the PR plane which is the plane of FIG. 3 of the drawing, and that which is defined by the intersection of the axes P and R. The antenna support yokes 30 and 31, and the pitch and roll rings supported on the base plate extension boss 14' do not move during such azimuth motion of the antenna assembly. As indicated in FIG. 3, the antenna support yokes are of sufficient length to provide clearance for the reflector 12 and the projecting radiator 11 of the antenna assembly so that they may be rotated 360 degrees in azimuth without contacting the fixed rear supporting surface of the base plate.

The primary supporting assembly 16 for the antenna is pivotally attached to the intermediate supporting assembly 20 by means of the bearing attachments 51 which connect the frame members of assembly 16 to each end of the upper arm 21 of the assembly 20. Such pivotal attachment permits limited movement of the antenna assembly 10 to provide a selected "field-of-view." To this end, a "tilt" motor and drive assembly 52 is secured to assembly 20 as indicated in FIG. 1. By means of an interconnecting lever arrangement 53 the tilt motion is transferred to the supporting frame 16 at the drive point 54 which is attached to or provided by any convenient frame member thereof. Therefore, the supporting assembly 16 and the antenna reflector 12 which is secured thereto will be rotated about the bearing 51 with respect to the support 20. Such movement of the antenna reflector will cause the beam or path of radiant energy to shift and thus provide a different "field-of-view" for the apparatus. Thus, in FIG. 1 when the lower end of the support 16 is rotated in a counterclockwise direction about the bearing support 51, the resultant radiant energy beam path will be correspondingly elevated causing such beam to "look" into an area which lies somewhat above the plane of intersection of the reflector R and P axes as illustrated in FIGS. 1 and 2. It should be emphasized that such "tilt" or "field-of-view" correction is independent of any corrective pitch movements of the antenna assembly.

When the position of the antenna reflector 12 is changed by means of the linkage 53 it may prove necessary or desirable to reposition the antenna radiator 11 a limited amount in order to maintain or obtain the desired beam optics. To this end, radiator 11 may be moved about the axis of its supporting pivot 19. Such motion is effected by means of the link arm 56 which is attached to the upper portion of the radiator support block 18 as shown in FIGS. 1 and 3. The rear end of link arm 56 is attached to the means 55 which transfer, either linearly or non-linearly as may be required, a proportionate amount of the motion of the support 16 and the reflector 12 to the radiator 11. Means 55 is shown secured to support 16; however it will be apparent that such means could, if desired, be secured to support 20. Any suitable mechanical and/or electrical motion transfer arrangements may be incorporated within the means 55 in order to provide the proper proportionate movement between the antenna reflector 12 and the antenna radiator 11. As illustrated generally in FIG. 1 the forward end of the link arm 56 may be secured or attached to the block 18 by any suitable clamping means, and the length of the link arm 56 may be adjusted so as to provide a predetermined initial relationship between the reflector and the radiator by means of such clamp element at block 18 or any conventional threaded linkage arrangement which can adjust the length of the link arm 56 intermediate block 18 and the means 55. Further, means 55 alone may be utilized to independently vary the relationship between radiator 11 and reflector 12 as by inserting a varying mechanical or electrical factor within means 55 in order to provide a particular "field-of-view" characteristic without moving reflector 12.

In accordance with known gyroscopic stabilization and servo-system positioning techniques it will be apparent that individual means must be provided to continuously monitor and indicate the position of antenna assembly 10 in roll, pitch, and yaw or azimuth, so that useful position information may be fed back into the system. In accordance with known principles such position information may be derived as an electrical quantity by means of suitable known synchro generators or control transformers. Antenna roll position information may be developed by such a synchro connected into the gear train through which motor 44 positions the roll ring 43. Antenna pitch position information may be similarly derived by means of a synchro which is connected into the gear train 48a–d which interconnects the motor 45 which positions the pitch rings 41 and 42.

In the case of the antenna azimuth position information, however, certain of the antenna azimuth drive elements adjacent the upper antenna pivot 25 may not maintain a constant positional relationship due to the relative movements of the two yoke arm attaching means 29, the upper antenna pivot housing 25, and the azimuth drive shaft 37. This is occasioned by the fact that the forward extremities of the upper ends of the antenna support yokes 30 and 31 may not move with the same exact degree of angular rotation about the azimuth drive shaft 37 with respect to the upper pivot 25 when the yoke positions are changed due to movements of the yoke pivots 32 and 33 when pitch correction is effected by the gear driven pitch rings 42 and 43. The non-uniform motion of the yokes may be occasioned by a number of factors, some of which include the tooth clearances and backlash through the plurality of gears 45, 46, 47 and 48a–d.

Such non-uniform motion of the upper yoke ends is, of itself, of no particular effect as to the overall positioning accuracy of the antenna assembly 10 so long as some member adjacent the upper pivot 25 may be established with respect to shaft 37 to read-out the present azimuth position of the antenna. Stabilized azimuth position information is derived by means of the provision of an azimuth reference platform assembly 57 adjacent pivot 25 which remains substantially constant despite variations in the angular position of the upper ends of the yokes about the azimuth shaft 37.

As shown in FIGS. 1 and 2 a spur-gear 52 is provided intermediate the annular plates 53 and 54 which are attached to the respective extremities 29 of the support yokes 30 and 31 concentrically with the drive shaft 37 and adjacent the upper pivot element 25. A short annular section of beveled gear teeth 55 is provided integrally with or secured to the forward lower edge of disc 53 which moves with the yoke 30. Such teeth 55 mesh with the teeth of spur-gear 52 along the upper periphery thereof. In a similar manner a second segment of beveled annular teeth 56 is provided integrally with or attached to the upper forward edge of the disc 54 which disc moves with the yoke 31. The combination of spur-gear 52 and the interrupted beveled annular gear tracks 55 and 56 acts in the manner of a differential gear arrangement so that the angular position of spur-gear 52 represents an integrated or averaged position which reflects the difference between the limited angular motions of the yoke discs 53 and 54. In practice such angular difference may amount to 1½° to 2°. Gear 52 is secured to a shaft 58 which is carried by the azimuth reference platform 57. Thus the angular position reference information derived by spur-gear 52 is imparted into the system by synchro means which are coupled to the output end of shaft 58 within the azimuth reference platform 57 and to shaft 37 or the drive gearing thereof.

Certain modifications or additions may be utilized where desired. For example, suitable limit switches may be provided adjacent the several axes of antenna stabilization, in order to control the particular drive motor which positions the antenna assembly about that axis. Thus, limit switches may be mounted on the upper antenna pivot element casing 25 to cooperate with cams carried on the support 20, in order to control the azimth drive motor 34. By such known means, the azimth antenna motion may search or scan a particular sector rather than a continuous 360° sweep. In a preferred embodiment of the invention the utilization of limit switches has provided for antenna beam motions away from a "dead-ahead" path aligned with the fore-and-aft vehicular axis which have been limited to 15° or 30° in a clockwise or counterclockwise azimuth direction; to 30° of starboard or port roll; to approximately 20° overall pitch motion; and to 10–20° overall tilt motion. It should be noted that provision for indicating or reading out the tilt motion of the antenna may be provided by a synchro generator or control transformer attached to the means 52. Also, the drive motors 34, 44, 45, etc. may be either electric or hydraulic.

Various additional changes, modifications, and modes of operation of the present invention will be apparent to those skilled in the art. Such changes may be incorporated into the preferred embodiment thereof which has been described above without affecting the spirit and scope of the invention, which is to be broadly construed as defined in the appended claims.

What is claimed is:

1. A stabilized gimbal mounting arrangement for a directive mechanism located on a vehicle comprising, in combination, a base plate of planar configuration, means to secure said base plate to the vehicle in a fixed position in a plane which contains lines which lie substantially parallel to the yaw and pitch axes and normal to the roll axis of the vehicle, a circular trackway mounted on said base plate with the center thereof coincident with the vehicle roll axis, an antenna mechanism including a reflective surface having three pivot axes mutually perpendicular to one another and intersecting in a common pivot point forward of such surface, said axes being designated as yaw, pitch, and roll, a pair of yoke members pivotally attached to said surface along the yaw axis thereof and extending rearwardly of such surface for moving said surface about the other two of said axes, a support pivot secured to the base of each yoke member in a fixed relation thereto with the support pivot axis aligned with said common pivot point, a pair of yoke support elements operatively coupled to said yoke base support pivots, and driving means coupled to said yoke support elements to selectively position the same along said circular trackway.

2. An antenna mechanism including a reflective surface having three pivot axes mutually perpendicular to one another and intersecting in a common pivot point forward of such surface, said axes being designated as yaw, pitch, and roll, a pair of yoke members pivotally attached to said surface along the yaw axis thereof and extending rearwardly of such surface for moving said surface about the other two of said axes, a support pivot secured to the base of each yoke member in a fixed relation thereto with the support pivot axis aligned with said common pivot point, a pair of yoke support elements operatively coupled to said yoke base support pivots, a circular trackway located rearwardly of said reflective surface and lying in a plane parallel to that defined by the intersection of the yaw and pitch pivot axes and having a center coincident with the roll pivot axis of said reflective surface, and driving means coupled to said yoke support elements to selectively position the same along said circular trackway.

3. An antenna mechanism in accordance with claim 2 further including additional drive means mounted on one of said yoke members adjacent said yaw axis to rotate said reflective surface about the yaw axis.

4. An antenna mechanism in accordance with claim 2 wherein said driving means positions both yoke support elements in the same direction along said trackway to move said reflective surface about the roll axis, and positions each yoke support element in an opposite direction along said trackway to move said reflective surface about the pitch axis.

5. An antenna mechanism in accordance with claim 2 further including means to tilt said reflective surface about a tilt axis parallel to the pitch axis thereof.

6. An antenna mechanism including a concave reflective surface having three pivot axes mutually perpendicular to one another and intersecting in a common fixed pivot point forward of such surface, a base plate located rearwardly of such surface along a first one of said axes and normal thereto, and support linkages interconnecting said surface and spacing the same from said base plate; said linkages including a first pair of aligned spaced bearing supports located along a second one of said pivot axes adjacent opposite edges of said reflective surface, and a second pair of convergent spaced bearing supports located on ring means adjacent and parallel to said base plate along a circular path whose center coincides with the intersection of said first one of said axes with said ring means; the projected axes of said second bearing supports lying at all times along a conical surface whose base is said circular path and whose tip is said common fixed pivot point.

7. An antenna mechanism including a concave reflective surface having three pivot axes mutually perpendicular to one another and intersecting in a common fixed pivot point forward of such surface, a base plate located rearwardly of such surface, and support linkages interconnecting said base plate and said surface in spaced relation, and operatively pivoting the latter about said common fixed pivot point; said linkages including a pair of spaced convergent physical bearings located on ring means adjacent and parallel to said base plate whose projected bearing axes intersect and form a virtual hinge at said common fixed pivot point.

8. A mechanism according to claim 6 further including driving means coupled to said second pair of bearing supports to selectively position the same along said circular path, wherein said driving means positions both said second bearing supports in the same direction along said path to move said reflective surface about the first pivot axis, and positions each second bearing support in an opposite direction along said path to move said reflective surface about the third pivot axis.

9. A mechanism in accordance with claim 6 further including means to tilt said reflective surface about a tilt axis parallel to the third pivot axis.

References Cited in the file of this patent
UNITED STATES PATENTS

| | | |
|---|---|---|
| 1,548,958 | Sperry | Aug. 11, 1925 |
| 2,512,636 | Flynt | June 27, 1950 |
| 2,537,822 | Fritts | Jan. 9, 1951 |
| 3,040,318 | Lang et al. | June 19, 1962 |
| 3,084,342 | Fuller et al. | Apr. 2, 1963 |